United States Patent
Sekine et al.

(10) Patent No.: US 6,476,887 B1
(45) Date of Patent: Nov. 5, 2002

(54) PREPARATION OF LIQUID CRYSTAL DISPLAY USING MULTIPLE LIGHT BEAM SCANNING SPEEDS

(75) Inventors: Yasuhiro Sekine; Shunsuke Inoue, both of Yokohama; Hiroshi Mizuno, Zama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/929,036

(22) Filed: Aug. 15, 2001

Related U.S. Application Data

(62) Division of application No. 09/038,687, filed on Mar. 9, 1998, now Pat. No. 6,313,894.

(30) Foreign Application Priority Data

Mar. 10, 1997 (JP) .............................................. 9-055247
Oct. 27, 1997 (JP) .............................................. 9-294475

(51) Int. Cl.[7] .......................................... G02F 1/1333
(52) U.S. Cl. .............................. 349/93; 430/20; 349/88
(58) Field of Search ............................. 349/92, 93, 88; 430/20

(56) References Cited

U.S. PATENT DOCUMENTS

| | | | | |
|---|---|---|---|---|
| 5,437,946 A | * | 8/1995 | MCoy | 430/5 |
| 5,469,278 A | | 11/1995 | Takahara et al. | 349/86 |
| 5,734,454 A | | 3/1998 | Omae et al. | 349/86 |
| 5,757,448 A | | 5/1998 | Takei | 349/92 |
| 5,852,484 A | | 12/1998 | Inoue et al. | 349/86 |
| 5,859,690 A | * | 1/1999 | Toguchi | 355/53 |
| 5,872,608 A | | 2/1999 | Inoue et al. | 349/86 |
| 5,898,480 A | * | 4/1999 | Ozawa | 355/67 |

FOREIGN PATENT DOCUMENTS

| | | |
|---|---|---|
| EP | 512 397 | 11/1992 |
| EP | 703 485 | 3/1996 |
| JP | 561016 | 3/1993 |
| JP | 06 281915 | 10/1994 |
| JP | 06 281916 | 10/1994 |

* cited by examiner

*Primary Examiner*—Kenneth Parker
(74) *Attorney, Agent, or Firm*—Fitzpatrick, Cella, Harper & Scinto

(57) ABSTRACT

This invention provides a liquid crystal display which comprises a first region including a display region, and a second region being outside the first region, wherein the first and second regions both contain liquid crystal in a polymer network, and a part of the polymer network of the second region is different in structure from the polymer network of the first region, and the part is present in the second region asymmetrically with respect to the first region, and a production method for a liquid crystal display, which comprises providing a liquid crystal material and a prepolymer material in a space between a pair of substrates at least one of which is transparent, and polymerizing the prepolymer material by scanning a first region including a display region and a second region outside the first region with a light beam which causes polymerization.

5 Claims, 7 Drawing Sheets

PREPARATION OF LIQUID CRYSTAL DISPLAY USING MULTIPLE LIGHT BEAM SCANNING SPEEDS

This application is a division of application Ser. No. 09/038,687 filed Mar. 9, 1998 now U.S. Pat. No. 6,313,894.

BACKGROUND OF THE INVENTION

1. Field of the Invention

The present invention relates to a liquid crystal display (LCD) device constituted of liquid crystal mixed with a polymer, and a projector using it, and also relates to a method for manufacturing the LCD device.

2. Related Background Art

In recent years, the liquid crystal display device has been employed in various apparatuses, as represented by a direct vision display of a diagonal length of 10 inch or more. Further, according to the popularization of computers, the liquid crystal projector of high resolution and brightness, which projects enlarged images to a screen from a liquid crystal panel combined with an optical system, has begun entering into a market as a practical product.

The liquid crystal materials used in such a liquid crystal panel are of TN (twisted nematic) type, and give rapid response and high contrast compared with those of STN (supertwisted nematic) type mainly used before, to display images of higher quality.

A display device using a TN liquid crystal, however, has a limited brightness because of considerable light loss due to the polarizers, which defect is conspicuous in a projector type liquid crystal display device which requires a high brightness.

To solve this problem, there has been proposed a liquid crystal display device using a "polymer network liquid crystal (PNLC)" in which a TN liquid crystal material has been distributed in a polymer network. In this device, when an electric voltage is applied, the TN crystal comes to have a refractive index approximately the same as that of polymer network, and light passes through with a high transmittance, and when the electric voltage is not applied, TN crystal takes a random alignment to have a different refractive index from that of polymer network, and thus incident light is scattered, to display black. The display device using a "polymer network liquid crystal" does not use polarizers, and thus is a display of higher light efficiency, that is, a brighter display, than the TN liquid crystal display device.

The term "polymer network liquid crystal" used in this specification may be also applied to liquid crystals having similar structural features, such as a polymer dispersed liquid crystal (PDLC) and liquid crystals of spongy structure.

To further enhance the high light efficiency of "polymer network liquid crystal", it is effective to use the active matrix substrate of reflection type. This is because the reflection type substrate can place active elements beneath the reflective electrode which can also serve as a shield against light, and thus permit the aperture to open nearly to its full range. Therefore, even if the size of pixel is reduced, it has a potential to maintain the same light exploitation efficiency, in contrast with the transmission type panel.

When a reflection type "polymer network liquid crystal" or a "polymer/liquid crystal compound membrane" or a "liquid crystal dispersed in polymer" is manufactured, active elements are embedded under the reflective electrode of the reflective active matrix substrate, and polymer and liquid crystal materials are injected and enclosed into the space between the substrate and transparent electrode, followed by exposure to ultra-violet (UV) light to produce a liquid crystal panel.

The above manufacture of a "polymer dispersed liquid crystal" is described in Japanese Patent Application Laid-Open No. 5-61016. According to the disclosure, an acrylate composition which can polymerize under UV rays (Dalocure 1116 provided by Merck is used as a photo-polymerization initiator) and a liquid crystal composition (E8 provided by BDH) are blended to evenness, and the mixture is injected into a glass cell having ITO electrodes and exposed to UV rays (1 mW, 500 seconds) to produce a polymer dispersed liquid crystal (PDLC). By varying the content of the liquid crystal composition in PDLC between 65 to 75 weight % with respect to the total weight of polymer matrix and the liquid crystal composition, samples of various particle size were prepared.

However, it has been found that the liquid crystal panel produced by conventional UV exposure is often afflicted with uneven brightness. Particularly, when the whole surface of liquid crystal area is irradiated with parallel UV light, reduction of reflected light intensity, or light transmittance is observed at the center and its periphery of liquid crystal panel, in a concentric pattern. With a three-plate liquid crystal panel for color display, there occurs a concentric unevenness in hue. This is accounted for by uneven polymerization of the polymer or uneven size of liquid crystal particles, which may be caused by stresses generated during polymerization reaction. As another cause, one can think the influence of the seal during polymerization reaction, which may differ according to the distance from the seal.

When polymerizing monomer substance in a closed, plane region, uniform initiation of polymerization hardly occurs even though the energy required for polymerization initiation is supplied uniformly all over the area, and uncontrollable regional irregularity will develop, at least microscopically, due to the molecular level fluctuation of polymerizable materials.

In addition, as with the production of liquid crystal display panels, when the liquid crystal/prepolymer mixture is injected into a cell constituted of different materials such as an Si substrate on which elements are formed, an opposite glass substrate and a sealant, many factors including process factors disturb the uniformity and affect the progression of polymerization and it is very difficult to form a uniform network structure in the area uniformly and with good reproducibility.

Further, the conventional liquid crystal panel was found to have a problem in stability. Namely, it becomes often unstable because of the presence of a liquid crystal phase not reacted during UV exposure.

SUMMARY OF THE INVENTION

The object of the present invention is to provide a liquid crystal display which is free of display unevenness and made from a liquid crystal material of an improved stability by a simple production method.

According to one aspect of the present invention there is provided a liquid crystal display which comprises a first region including a display region, and a second region being outside the first region, wherein the first and second regions both contain liquid crystal in a polymer network, and a part of the polymer network of the second region is different in structure from the polymer network of the first region, and the part is present in the second region asymmetrically with respect to the first region.

According to another aspect of the present invention, there is provided a production method for a liquid crystal display, which comprises providing a liquid crystal material and a prepolymer material in a space between a pair of substrates at least one of which is transparent, and polymerizing the prepolymer material by scanning a first region including a display region and a second region outside the first region with a light beam which causes polymerization.

According to this invention, a liquid crystal layer is formed by photopolymerizing prepolymer by scanning with a light beam (such as a slit beam or spot beam), and thus an unevenness in brightness on display or unevenness in hue is improved. This is probably because stresses developed during the formation of a liquid crystal network are relaxed, which will contribute to uniform formation of the network in the display section.

According to this invention, the UV radiation process wherein UV rays are radiated to a mixture of liquid crystal/prepolymer consists of scanning a UV beam, of which cross-section shape is appropriately modified, over the cell surface. Thus, irregularity of brightness in the panel, a problem encountered in the conventional display, can be successfully improved, and thus the display characteristics of reflection type liquid crystal display panel are significantly improved.

This invention is applicable to a transmittance type liquid crystal display panel, as well as the reflection type liquid crystal display panel.

DETAILED DESCRIPTION OF THE PREFERRED EMBODIMENTS

The present invention provides a liquid crystal display device for a direct vision type or projection type liquid crystal display device, using a panel of polymer network liquid crystal having uniform brightness, obtained by UV radiation with a slit beam or a spot beam.

According to this invention where the UV radiation is carried out using a slit-shaped beam or a spot beam, formation of a network and annihilation of residual monomers can be controlled independently, and thus the characteristics of polymer network liquid crystal can be optimized from a general viewpoint.

According to this merit of this invention, it is possible to achieve panel characteristics of less unevenness in brightness, while maintaining good contrast, response speed, hysteresis, etc. Accordingly, it is possible with this invention to improve the overall quality of images of a display device.

In conventional devices, when the whole display surface is exposed to light at a time, uneven brightness in display results, even with uniform exposure of all over the display surface. For example, in an intermediate tone region, the periphery and center are often become darker than the other areas.

This is probably because, when polymer network structure is formed by light exposure, polymerization reaction does not proceed evenly, resulting in difference in polymer network formation from one place to another.

According to this invention, light exposure is carried out by scanning the surface of the liquid crystal panel with a converged light beam successively, instead of exposing all over the surface to light at a time, thereby making it possible to control the direction of photo-polymerization reaction, and thus the even development of polymer network structure.

When the light exposure is carried out at a time in a conventional process, there is a problem that the control of polymer network liquid crystal structure, improvement of stability of the liquid crystal material, and annihilation of residual monomer are incompatible with each other.

According to this invention, light exposure is carried out a plurality of times. For example, for the first exposure, light of a high intensity is used to determine the polymer network structure, and for the second and subsequent exposure, light of lower intensity is used to complete polymerization reactions of prepolymer material while preventing degradation of the liquid crystal material. Therefore, this invention enables us to control the polymer network structure, to improve the stability of the liquid crystal material, and to get rid of residual monomers.

Embodiment of Liquid Crystal Display Panel

Figure 6:
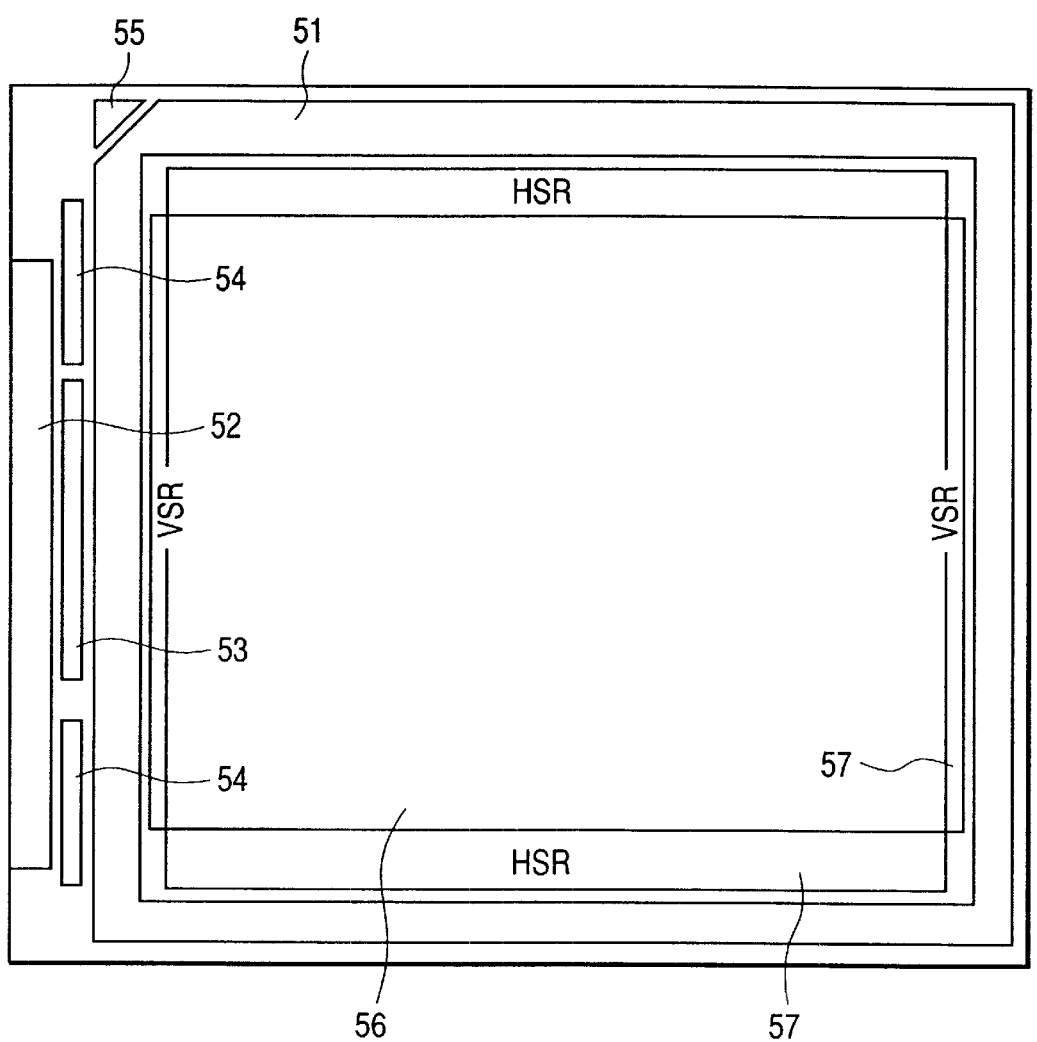
FIG. 6 is a flat view of a liquid crystal display panel with surrounding circuits.

FIG. 6 is a flat view of a liquid crystal display device according to this invention illustrating its constitution. In FIG. 6, 51 denotes a sealing section, 52, an electrode pad, 53, a clock buffer circuit and 54, amplifiers. These amplifiers 54 are used as an output amplifier when the electricity of panel is examined. An Ag paste section represented by 55 serves as a reference for the potential across opposite substrates, 56 represents a display section, and 57, a peripheral circuit including horizontal and vertical shift registers (HSR and VSR).

As shown in FIG. 6, this example has circuits outside as well as inside the sealing section to minimize the total chip size. In this example, the drawer of pad is placed on one side of display panel, but it may be divided into two portions placed on the two long sides of display panel, or into multiple portions placed on different sides of display panel. The latter arrangement is convenient when a fast clock is involved.

Further, when the panel of this invention with semiconductor substrates such as Si substrates is exposed to light with a high intensity as occurs with the projector type display device, and stray light falls on the side walls of substrates, the substrate potential undergoes a variation, and may cause wrong actions of the panel. In view of this, the side walls of panel and peripheral circuit section surrounding the display area constituting the top surface of panel are made of substrate holders impenetrable to light. In addition, the back surface of Si substrates is provided with a holder structure which has a metal with a high thermal conductivity such as copper (Cu) connected through an adhesive with a high thermal conductivity.

Figure 7:
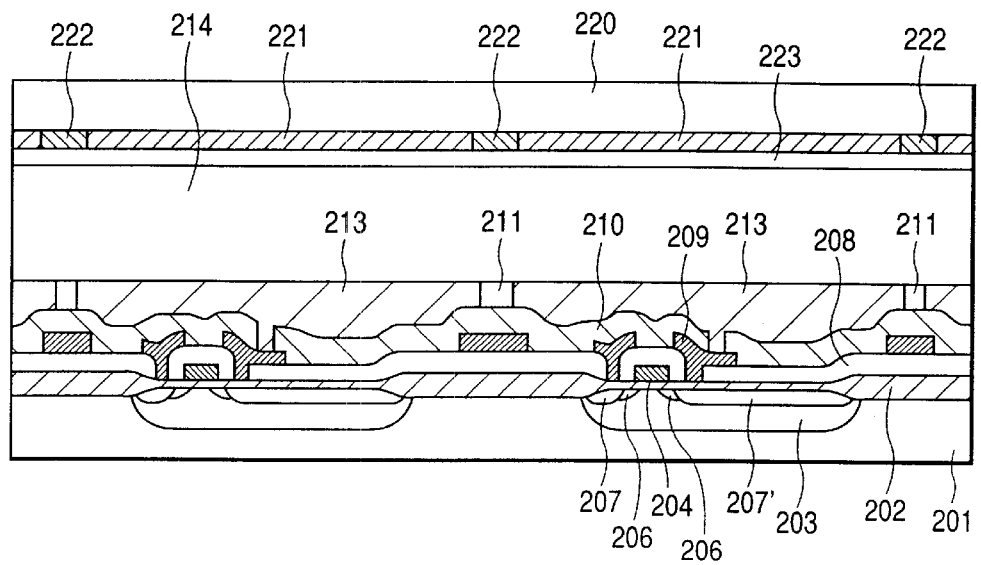
FIG. 7 is a sectional view of a liquid crystal display element to show a semiconductor device in a driving circuit.

FIG. 7 is a sectional view of a liquid crystal element of an active matrix substrate, or one of the structural elements of reflection type liquid crystal display device.

FIG. 7 illustrates a pixel section, and, it is possible to form peripheral driving circuits such as a shift register to drive switching transistors of a pixel section, at the same time with the formation of the pixel section. The structure will be described below in order of production processes.

An n-type silicone semiconductor substrate 201 with an impurity concentration of $10^{15}$ cm$^{-3}$ or less is partially oxidized to form a LOCOS 202. Then, with the LOCOS 202 as a mask, boron is introduced at a dose of about $10^{12}$ cm$^{-2}$ to the substrate through ion implantation, to form PWL203 or a p-type impurity region with an impurity concentration of about $10^{16}$ cm$^{-3}$. This substrate 201 is again submitted a heating treatment for oxidation, to give a gate oxidized membrane 204 having a thickness of 1000 Å or less.

A gate electrode 205 is formed which consists of n-type polysilicone doped with phosphor at a concentration of $10^{20}$ cm$^{-3}$. Then, over the whole surface of substrate 201 is applied phosphor at a dose of about $10^{12}$ cm$^{-2}$ through ion implantation, to form an NLD 206 which is an n-type impurity region with an impurity concentration of $10^{16}$ cm$^{-3}$. Immediately thereafter, with a patterned photo-resist as a mask, phosphor is given at a dose of about $10^{15}$ cm$^{-2}$ through ion implantation, to form source and drain regions 207 and 207' having an impurity concentration of about $10^{19}$ cm$^{-3}$ each.

An interlaminar membrane PSG208 is formed over the whole surface of substrate 201. It is possible to substitute, for this PSG208, NSG (Nondope Slicate Glass)/BPSG (Boro-Phospho-Silicate Glass) or TEOS (Tetraetoxy-Silane). Upon PSG208 just overlying the source and drain regions 207 and 207' are formed a pattern of contact holes, upon which Al is deposited through sputtering to achieve a patterning. Thus, Al electrodes 209 are formed. To improve an ohmic contact characteristic of the Al electrode 209 with the source and drain region 207 and 207', a barrier metal of Ti/TiN or the like is preferably inserted between the Al electrode 209 and the source and drain regions 207 and 207'.

Over the whole surface of substrate 201, a membrane of plasma SiN210 of about 3000 Å in thickness and then another membrane of PSG211 of about 10000 Å in thickness are formed in succession.

A pattern is formed on the plasma SiN210 to act as a dry etching stopper layer such that PSG211 remains only at the interval between adjacent pixels after etching, and then another pattern is formed by dry etching to give a through hole 212 just above the Al electrode being in contact with the drain region 207'.

A membrane of pixel electrode 213 of 10000 Å in thickness is overlaid on the substrate 201 by sputtering or through EB (Electron Beam) deposition. The pixel electrode may be a membrane composed of a metal such as Al, Ti, Ta, W, etc. or their compounds.

The surface of pixel electrode 213 is polished through CMP (Chemical Mechanical Polishing). The appropriate polished depth should be, if PSG211 and the pixel electrode have a thickness of 10000 Å and x Å respectively, less than x +10000 Å.

The active matrix substrate obtained through above procedure is bonded to an opposite substrate with a spacer (not illustrated here) in between, and into the space between the two substrates a liquid crystal 214 is poured to produce a liquid crystal element. In this example, the opposite substrate is composed of a transparent substrate 220 upon which fluorescence layer 221 emitting each color, black stripes 222 to enhance contrast, and common electrode 223 made of ITO or the like are formed.

A color filter, as long as it allows passage of UV rays, may be added thereto.

Driving Method of the Liquid Crystal Display Element

The driving method of the liquid crystal display element of this example will be outlined below. A signal potential is given through a peripheral circuit including a shift register which is formed on-chip on the substrate 201 to the source region 207, and at the same time a gate potential is given to the gate electrode 205 to put the switching transistor of pixel into action, and to provide the drain region 207' with a signal charge. The signal charge accumulates in a vacant capacitor at the pn junction formed between the drain region 207' and PWL203, and the resulting potential gives a potential to the pixel electrode 213 by way of the Al electrode 209. At the time when the potential of pixel electrode 213 reaches a desired level, supply of the potential to the gate electrode 205 is discontinued, to put off the switching transistor of pixel. Because the signal charge deposits in the capacitor at the aforementioned pn junction, the potential of pixel electrode 213 is stabilized until the switching transistor of pixel is activated for the next time. This stabilized potential of pixel electrode 213 drives the liquid crystal 214 enclosed between the substrate 201 and opposite substrate 220 illustrated in FIG. 7.

EXAMPLE 1

Constitution of Liquid Crystal Panel

Figure 5:
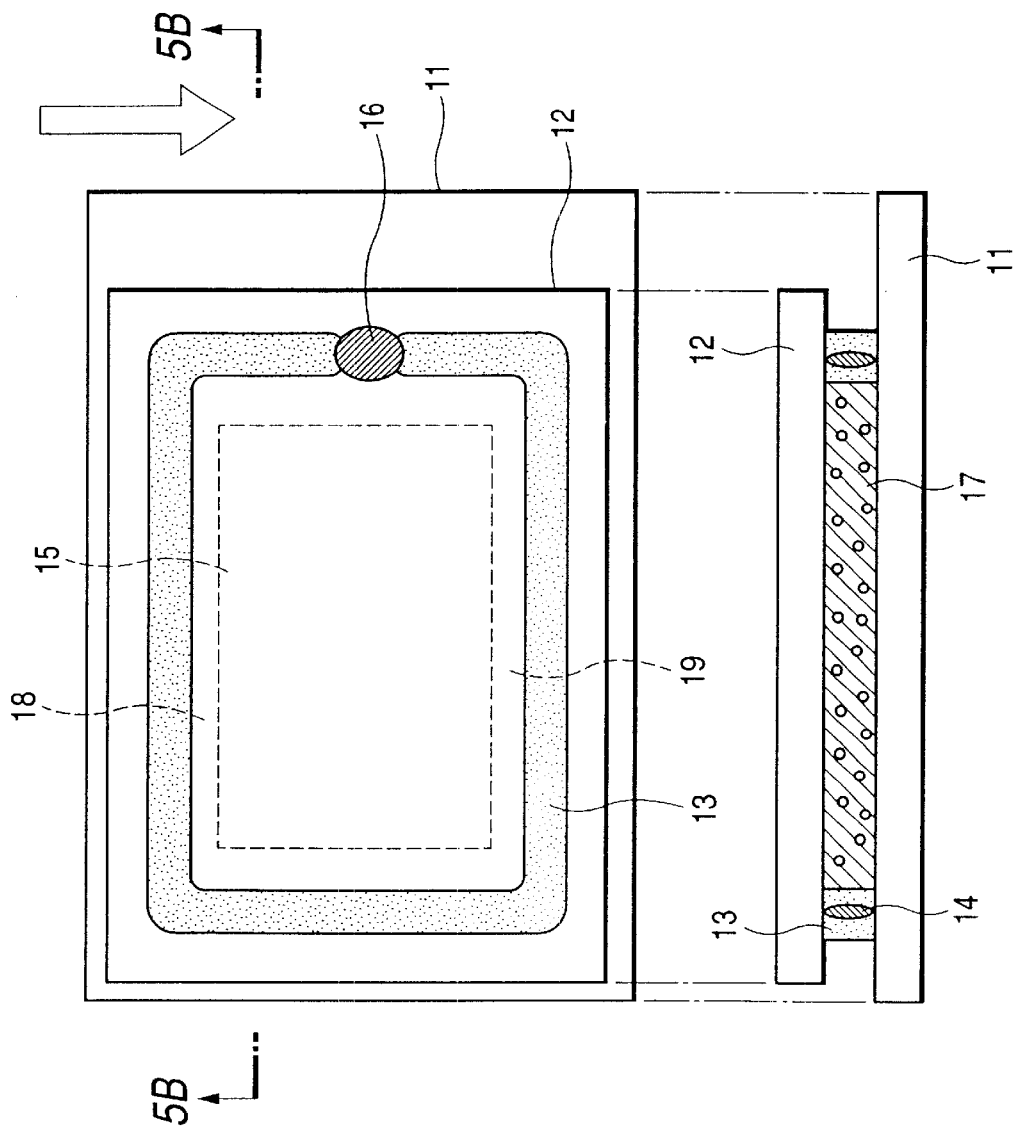
FIGS. 5A and 5B are flat and section views of a liquid crystal display device of this invention.

FIG. 5A is a flat internal view and FIG. 5B is a sectional view of the liquid crystal panel of the first example of this invention. In FIGS. 5A and 5B, 11 represents an active matrix substrate, 12 denotes an opposite glass as a transparent substrate, 13 denotes a main sealing agent, 14 denotes a spacer, 15 denotes a display region, 16 denotes an injection port for liquid crystal, 17 denotes a polymer network liquid crystal layer, 18 denotes a region between seal region 13 and the display region 15, and 19 denotes a region between another seal region 13 and display region 15.

In FIGS. 5A and 5B, 11 denotes an active matrix substrate which has been prepared by semiconductor processing and has a reflective electrode on its surface. The reflective electrode should preferably have a high flatness, and show a high reflection coefficient to visual rays. For example, in this example, the electrode was made of aluminum or aluminum containing a trace amount (0.5 to 3.0%) of other atoms (such as silicon, copper, titanium, etc.). Also in this example, as the substrate surface in contact with the liquid crystal layer was practically completely flat, uneven performance of display due to uneven thickness of liquid crystal layer or uneven injection of liquid crystal due to indentations was avoided.

To each pixel electrode is connected the draining section of switching element. The switching element preferably includes two-terminal devices such as MIM switches or Diode switches, or three-terminal devices such as thin-membrane transistors or mono-crystal silicon transistors based on the use of bulk silicon.

What is known to constitute the thin-membrane transistor includes amorphous silicon transistors, polysilicon transistors, SOI (Silicon On Insulator) mono-crystal transistor, etc. Whatever switching element described above may be used, it is possible to achieve this invention. This example incorporated a mono-crystal silicon transistor based on the use of bulk silicon as a switching element.

Further, a light shielding layer (made of, for example, titanium) is formed between the switching element and reflective electrode, to prevent stray light from interfering with proper action of the element.

Furthermore, the active matrix substrate incorporates a driving circuit including on-chip horizontal and vertical shift registers, and thus achieves a high speed signal handling at a low cost to give a high resolution display against a multi-pixel background.

Although a reflection type active matrix substrate was used in this example, use of a transmittance type active matrix substrate may be used for this invention with the same profit.

In FIGS. 5A and 5B, 12 represents an opposite glass sheet as a transparent substrate. The opposite glass sheet is about 0.5 to 3.0 mm in thickness, and preferably has a high flatness and a thermal expansion rate similar to that of active matrix substrate. For example, the opposite glass sheet used in this example was a piece of non-alkali glass (NH-35, NH Techno Glass) of 1.0 mm thickness.

For the reflection type liquid crystal panel, light reflection at the surface of opposite glass sheet and at the interface between the liquid crystal and the glass is a factor to reduce the contrast. As a means to avoid this inconvenience, in this example, not only a reflection-proof coat is applied on the outer surface of opposite glass sheet, but inner surface of the glass sheet facing the liquid crystal was coated with a membrane of a carefully chosen constitution. Namely, a transparent membrane which has a lower refractive index than that of the glass or ITO (for example, a membrane of $MgF_2$ with an refractive index of 1.38) is formed between the ITO (Indium-Tin-Oxide) transparent electrode being in contact with the liquid crystal surface and glass. The thickness of this membrane is chosen so as to give the least reflection, paying a due attention to the wavelength of incident rays.

This liquid crystal panel can be used also as a part of a color display device when a color filter has been implemented on-chip on the active matrix substrate. Further, for this liquid crystal panel to be used as a three-plate projection type display, preferably a reflection-proof means should be implemented which can handle with respective wavelengths of R, G and B rays.

13 denotes a main sealing agent which serves for maintaining the opposite glass and active matrix parallel and the distance between the two constant. The main sealing agent may include thermosetting resins, UV-cured resins, and dual active resins which can harden in the presence of UV rays as well as heating.

Spacer agent 14 to control the thickness of polymer network liquid crystal layer is mixed with the main seal agent to evenness, and a uniform pressure is applied thereto such that an even display characteristic within the panel is obtained. The material of spacer may include silica or resins. It may take the form of a column, sphere, or the like with the same profit. In this example, to give a precise gap, columnar spacers made of silica were employed with a close attention being paid not to damage supporting walls. The sealing area was prepared around the display area 15 with a sufficiently spacious margin in between. This is because the liquid crystal adjacent to the sealing area is slightly different in properties from the liquid crystal at the center of display, and introduction of such space contributes to prevention of development of uneven brightness in display.

Denoted by 16 is an injection port of liquid crystal. The injection port is closed with an end seal. The end seal may include allyl resins, modified epoxy resins, epoxy acrylate, or the like.

Denoted by 17 is a polymer network liquid crystal layer. The materials of polymer and liquid crystal consisted of followings.

Polymer and Liquid Crystal Materials

Firstly, the prepolymer material may include, for example, polyacrylate, polymethacrylate, or the like. What is the best among them is polyacrylate.

In addition, the liquid crystal material may include, for example, biphenyl, phenylbenzoate, and phenylcyclohexane liquid crystal compositions, or the like.

The polymer network liquid crystal of this invention is produced according to the "slit radiation" method of this invention, and possesses excellent characteristics of such as contrast, response velocity, hysteresis, thermal response, reactivity to driving voltage, retention of voltage, etc. In addition, this polymer network liquid crystal can minimize uneven brightness in the panel.

Projection Type Liquid Crystal Display Device

A projection type liquid crystal display of high brightness and of high resolution and quality can be produced by arranging three R, G and B panels in the optical system, each utilizing the liquid crystal panel of this invention.

Figure 4:
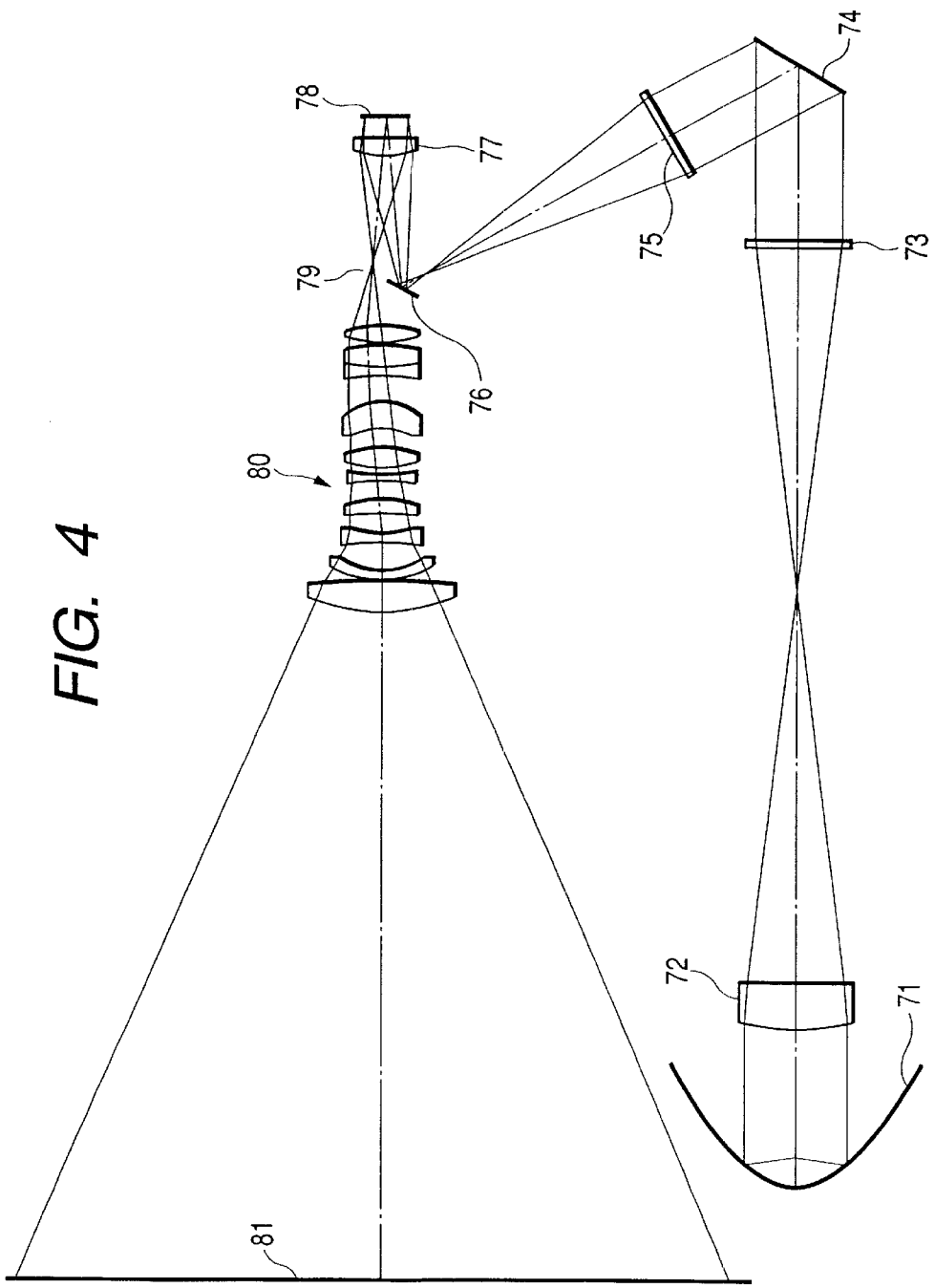
FIG. 4 is a schematic example of the constitution of a projector according to this invention.

FIG. 4 is a schematic diagram illustrating the constitution of a projection type display device incorporating a liquid crystal panel fabricated according to this invention, and the features of this invention are evaluated according to the measurements performed on this device.

In FIG. 4, 71 represents a light source such as a halogen lamp, 72 a converging lens to converge the light source image, 73 and 75 planar convex-type Fresnel lenses, and 74 a color separating optical element to separate R, G and B components which may be constituted by a dichroic mirror or a diffraction grating.

Further, 76 represents mirrors which distribute R, G and B rays separated as above to respective R, G and B panels, 77 a vision lens which converts a converged light beam into parallel rays and directs them to a projection type liquid crystal panel, 78 a projection type liquid crystal element and 79, a diaphragm.

Furthermore, 80 represents a projection lens, and 81 a screen which, typically, if it is constituted by two plates, that is, a Fresnel lens to convert projected light into parallel rays, and a lenticular lens to allow the incident light to expand to give a wide visual angle both in vertical and horizontal directions, will give a clear and bright image high in contrast.

In the diagram of FIG. 4 illustrating the constitution, only one panel is depicted, but the device constituting the color separating optical element 74 to the diaphragm 79 is separately prepared for the three color components, and thus a three-plate panel is implemented. Further, needless to say, this invention can be applied not only to a three-plate system, but to a mono-plate system after a micro-lens array is implemented on the surface of projection type liquid crystal panel to direct different incident rays on different pixel areas. A voltage is given to a liquid crystal in a liquid crystal layer to allow rays to be reflected from individual pixels which pass through the diaphragm represented by 79 to be projected on a screen.

By contrast, when the voltage is not given and the liquid crystal layer becomes an isotropic body, light incident on the projection type liquid crystal element scatters in all directions, and thus stray light except the portion included within the angle projected from the aperture of diaphragm represented by 79 does not enter a projection lens. Therefore, under this condition black is displayed.

In FIG. 4, F value of the projection optical system is 8.0. Light radiated from the source 71 is modulated/reflected by the liquid crystal 78, enlarged by a projection lens 80 and projected on a screen 81. Evaluation of the system was performed while a 250(W) metal halide lamp was used as the light source. For this system to be used as a display system, it is of course possible to employ a high pressure mercury lamp, xenon lamp, or the like instead. The necessary output power is not limited to what is described above. Evaluation is performed on the system only through G channel through which passes rays with a central wavelength of 550(nm), unless otherwise stated.

For R, G and B plates to be combined to form a display system, it is only necessary to separate incident rays by a dichroic mirror or the like into the three color components, and to arrange liquid crystal panels corresponding to respective color components in a space in such a way as to overlap the respective color images on a screen.

Production of Liquid Crystal Panel

The method how to fabricate the liquid crystal panel will be described below.

Substrate Bonding Process

Firstly, active matrix substrates cut to fit to corresponding panels, and opposite glass plates to face the former were prepared. They were wash ed clean in a clean environment so as not to be contaminated by foreign matters and dusts. It was effective to wash them in deionized ultra-pure water supplemented with a surfactant and bubbled with carbon dioxide, or in ultra-pure water exposed to an ultrasonic wave. The reflective electrode may have a thin, protective coat on its surface when necessary because it is very vulnerable to corrosion by chemical agents. Alternatively, when it is made of aluminum, it may have a membrane on its surface which is allowed to develop by some means as a result of spontaneous oxidation.

After having been rinsed thoroughly, they were submitted to an IPA paper drying and then to a renewed drying.

Then, the main sealing agent supplemented with a spacer agent was applied on the active matrix substrate in such a way as to give a desired configuration. As the main sealing agent used was World Lock 706 provided by Kyoritsu Chemical Industry Co. which hardens in the presence of either UV rays or heat. It is possible for a layer composed of a polymer network liquid crystal to have a thickness of 5 to 20 $\mu$m. The corresponding layer of this example had a thickness of 13 $\mu$m. To meet this condition, a spacer of 13 $\mu$m in length was used.

Further, to allow passage of electricity between the active matrix substrate and ITO transparent electrode prepared on the opposite glass, silver paste was applied on specific sites.

Then, the active matrix substrate and opposite glass were bonded together with a bonding machine. During bonding a pressure was applied practically in parallel with the substrate such that the diameter of spacer agent has a thickness similar to that of liquid crystal at the front surface of panel.

For the main sealing agent used in this example, UV rays were radiated here, to harden the main sealing agent, and a thermal treatment consisting of heating at 120° C. for 60 minutes was added as an after-curing, to finish the hardening of main sealing agent. When a UV-setting type setter is used, UV rays should be radiated at this stage to harden the main sealing agent.

Alternatively, when a thermosetting agent is used, the thickness of gap may vary easily owing to contractions and expansions the setter undergoes during thermosetting. As a measure to avoid this flaw, it was effective to take a recourse to a thermal treatment while an appropriate pressure is given to the panel. Further, to effectively remove gases and volatile components trapped in the main sealing agent, it will effective to submit the agent in question to evacuation for removal of such residual gases after thermosetting.

Process of Liquid Crystal Injection

The cell produced by bonding was then submitted to a liquid crystal injection process whereby a liquid crystal is injected therein. Injection of a liquid crystal is achieved after the cell and a syringe filled with a mixture comprising liquid crystal/prepolymer have been placed in a liquid crystal injection apparatus, and the mixture comprising liquid crystal/prepolymer was dropped into the cell through the injection port of cell for injection of the mixture comprising liquid crystal/prepolymer. The mixture comprising liquid crystal/prepolymer used in this example refers to a solution which results by blending a liquid crystal component, a prepolymer component and a photoinitiator to evenness.

Polymer Material and Liquid Crystal Material

Further, as mentioned earlier, as for their materials, firstly, the material of prepolymer includes, for example, polyacrylate, polymethacrylate or the like, and among them, polyacrylate is the best. Furthermore, the material of liquid crystal may include, for example, biphenyl, phenylbezoate or phenylcyclohexane liquid crystal compositions. The photoinitiator may be exemplified by benzyldimethylketal or 2-chloro-9H-thioxanthene-9-one.

The liquid crystal injection process will be described in detail below.

The liquid crystal injection apparatus is composed of a degassing chamber where degassing of the mixture of liquid crystal/prepolymer is achieved, and a cell chamber where injection of a liquid crystal is achieved. Firstly, the mixture of liquid crystal/prepolymer is heated for 30 minutes in an oven which has been kept at 50° C., and then stirred for one minute to give a homogeneous mass. The resulting even solution is allowed to fill a syringe in the degassing chamber for injection of the liquid crystal/prepolymer. The syringe filled with the mixture of liquid crystal/prepolymer is set in the degassing chamber, the assembly is placed in a cell-holding cassette, and the cassette is placed at a specified position in the cell.

The liquid crystal injection apparatus is properly adjusted so as to perform degassing of the mixture of liquid crystal/prepolymer, evacuation of the cell interior, heating of the cell, pressure control of the cell and degassing chamber, opening/closure of valves, injection of the mixture of liquid crystal/prepolymer from the syringe into the cell, and evacuation of the cell after injection, in a sequential and automatic manner.

To avoid, during liquid crystal injection process, a variation in composition of the mixture of liquid crystal/prepolymer which may arise as a result of vapor pressure difference among the components of the mixture of liquid crystal/prepolymer which may cause those components to vaporize differently, the vacuum of degassing chamber is preferably maintained at 0.01 to 10 Torr. In this example, 0.5 Torr was adopted. Degassing time is preferably one minute to 100 minutes. In this example, ten minutes was adopted.

Further, to avoid the entry of impurities into the cell during evacuation, or to eliminate trace amounts of contaminants from the main sealing agent, heating of the cell may be effective. Heating the cell to a temperature more than room temperature and less than the decomposing point of main sealing agent is effective, and in this example, the cell was heated to 100° C. Intense evacuation with a vacuum of 10 Torr or less maintained for a long time would be effective, but in this example evacuation with a vacuum of 0.001 Torr was maintained for one hour.

After evacuation, a trace amount of nitrogen was introduced into the interior of cell to reduce the vacuum there, and thereby to restrict a variation in composition of the mixture of liquid crystal/prepolymer as much as possible while the mixture was injected from the syringe into the cell. In this example, the vacuum during injection of the mixture was maintained at 0.5 Torr.

In addition, before the mixture of liquid crystal/prepolymer was dropwise introduced through the injection port, dummy dispensing was performed without fail. Namely, the entry of the mixture of liquid crystal/prepolymer which resided at the tip and which might undergo deterioration was avoided thereby.

Injection of the mixture of liquid crystal/prepolymer completed in about 15 minutes when time was counted from the first dropwise fall of the mixture of liquid crystal/prepolymer into the injection port of cell.

Although in this example the method for liquid crystal injection consisted of introducing dropwise a mixture of liquid crystal/prepolymer into the injection port of cell, other methods such as contacting the injection port of cell with the outlet of a container enclosing a mixture of liquid crystal/prepolymer within the cell, dropwise introduction of a mixture of liquid crystal/prepolymer into the injection port of cell under a normal atmospheric pressure, and contacting the injection port of cell with the outlet of container enclosing a liquid crystal/prepolymer under a normal atmospheric pressure were all found to allow a normal injection of the mixture.

Further, during the liquid crystal injection process and UV radiation process or a post-process subsequent to the liquid crystal injection process, it is necessary to pay close attention to keep the temperature of mixture of liquid crystal/prepolymer over the temperature point at which the components of mixture start to separate into different phases, until UV radiation starts. If the temperature in question fell below the temperature point at which the components of mixture will separate from each other, a normal polymer network structure which is to be formed in later processes would never be obtained, and a degraded display result.

Furthermore, until radiation of UV rays is applied on the cell surface of liquid crystal panel to be described later, it is necessary to eliminate as far as possible factors that may promote polymerization reactions such as radiation of UV rays to the mixture of liquid crystal/prepolymer, a rise in temperature, and unnecessarily elapsed time for preparation.

Light Exposure Process

After removing the mixture of liquid crystal/prepolymer and foreign matters adhered onto the cell surface of the liquid crystal panel, UV light radiation was carried out onto the cell surface.

UV radiation onto the cell surface has two purpose: one is to apply UV light in a wavelength range to which the prepolymer component in the liquid crystal/polymer mixture in the cell is sensitive to polymerize; and the other is to promote the phase separation between the liquid crystal and prepolymer components, thereby to form a polymer network structure constituted by a UV-set resin and a liquid crystal component in the cell.

Parameters during UV radiation include the mode of UV radiation (one step radiation, two step radiation, etc.), UV wavelength, radiation time, cell temperature, standing period conditions between successive radiation steps in two or multi-step radiation, time length and environment.

In this example, the UV radiation mode, UV radiation intensity and UV radiation time were investigated as necessary parameters to be checked during UV radiation.

Light Radiation Device

A UV radiation device used in this example incorporated a 4 kW ultra-high voltage mercury lamp as a light source. This UV radiation device was further provided with an optical filter 6 to shut off short wave UV rays with wavelengths below 350 nm in order to prevent the mixture of liquid crystal/prepolymer and the polymer network structure to be formed after UV radiation from being disintegrated.

The cell was allowed to have a temperature of 19.0° C. during UV radiation. Temperature control of the cell was achieved by placing the cell on an X-Y stage 8 with a temperature control capability (thermal chuck (TC 2800) provided by Trio-Tec Co.), and the temperature of cell was monitored with a thermocouple placed in contact with the X-Y stage 8 with a temperature control capability. The stability over time of the X-Y stage with a temperature control capability was ±0.2° C. or less.

Figure 1:
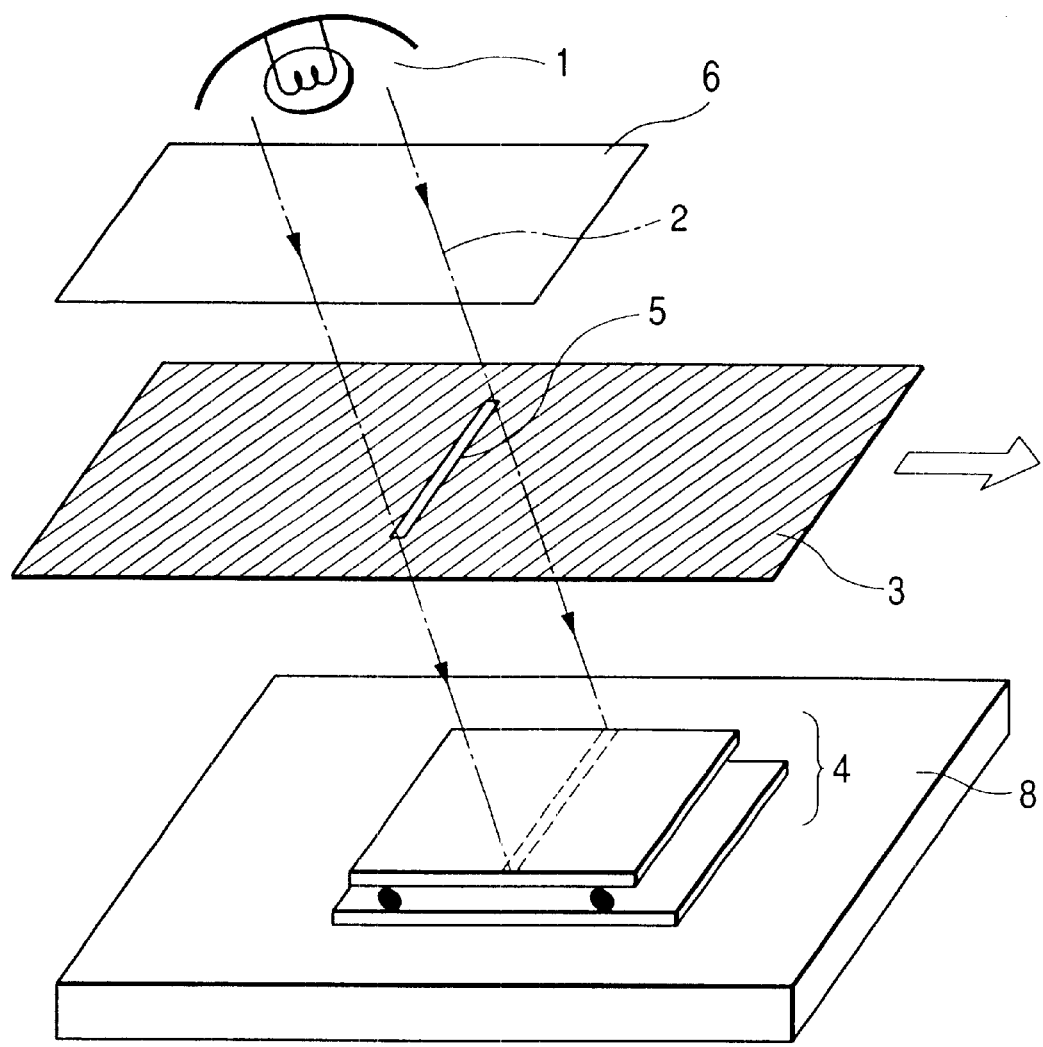
FIG. 1 is a schematic example of the constitution of a light radiation device applicable to the production method of the liquid crystal display device of this invention.

Specifically, FIG. 1 is a schematic diagram illustrating the constitution of the system whereby UV rays in the form of a band is radiated onto desired regions, while scanning one region after another, of the cell surface of liquid crystal panel. In FIG. 1, 1 represents a source of UV rays, 2 UV rays, 3 a steel plate with a slit, 4 the liquid crystal panel, and 5 the slit.

A UV beam scanner is capable of supporting a steel plate being placed 1 mm above the cell surface of liquid crystal panel 4, provided with a slit of 1 mm in width and 30 mm in length, having its surfaces surrounding the slit plated with black zinc, and having a thickness of 0.3 mm, and of moving the steel plate 3 over the cell surface in the direction of slit at a specified speed to scan the rays on the cell surface.

The scanner to scan with a UV beam is mounted to the UV radiation device, the cell (liquid crystal panel 4) was placed on the X-Y stage 8 with a temperature control capability, and the UV beam was allowed, if the steel plate had not covered the cell surface in such a way as to shield the surface from exposure to any light, to fall on the whole surface of the cell. Then, the steel plate was moved in the direction of width of the slit to allow UV rays to scan the cell surface.

When the cell surface was exposed to UV rays, the liquid crystal material was separated within a few seconds to allow the polymerization reaction to proceed, and the interior of cell which had been transparent before UV radiation turned milky white subsequent to UV radiation owing to the formation of polymer network structure.

When another session of UV radiation was instituted for two-stage radiation, the illumination intensity and duration of UV radiation were changed in the same manner as above. In the second session of UV radiation, an emphasis was put on the comparison between the result obtained from the overall radiation of the cell surface and the result obtained from successive radiation through a slit.

End Sealing Process

After exposed to UV light, the injection port of the cell was sealed.

The end sealing agent used was a UV setting epoxyacrylate resin or 30Y-195B provided by Three Bond Co. The end sealing agent was applied on the injection port of cell, the liquid crystal display of cell was shielded against light, and then UV radiation was applied to the end sealing agent in question to allow it to harden and to complete end sealing.

Besides above, the end sealing agents such as a UV setting acryl resin A704 provided by Sekisui Fine Chemicals Co., or similar chemicals provided by Kyoritsu Chemical Industry Co. gave the same results.

Next, after foreign matters adhered onto the cell surface had been removed, the cell was bonded onto a holder for assembling optical systems, then elements on a flexible printed substrate on the holder involved in the transmission of image signals were connected, and the electrode pad of active matrix substrate was connected by wire bonding with the flexible substrate, to complete a liquid crystal display panel.

UV Radiation Condition of the Example

The UV radiation condition used in the investigation of this example will be shown below.

(1) For One-stage UV Radiation

Illumination intensity of UV radiation: 20 to 150 mW/cm$^2$

Slit width: 0.5 to 100 mm

Moving speed of slit: 1 to 100 mm/s (2) For Two-stage UV Radiation

First stage radiation

Illumination intensity of UV radiation: 20 to 150 mW/cm$^2$

Slit width: 0.5 to 100 mm

Moving speed of slit: 1 to 100 mm/s

Second stage (for overall, one-stroke exposure)

Illumination intensity of UV radiation: 1 to 20 mW/cm$^2$

Duration of radiation: 10 to 3000 seconds

Second stage (for bit by bit radiation through slit)

Illumination intensity of UV radiation: 1 to 20 mW/cm$^2$

Slit width: 0.5 to 100 mm

Moving speed of slit: 0.1 to 100 mm/s

Instead of scanning the surface of LCD panel 4 with a UV beam defined by slit 5, UV exposure was carried out by moving the panels under the fixed UV beam with also satisfying results.

Investigation was made while the temperature of cell during radiation was kept over the point where the components comprising the mixture of liquid crystal/prepolymer start to separate each other through phase difference, but less than the level by 30° C. above that point.

Examining the formation process of milky polymer network structure formed by irradiating with a slit-defined UV beam in detail, we found that the formation speed of polymer structure is not uniform in the panel.

The formation speed is relatively uniform over the entire image display region, but the speed differs where UV light passes over the border between the seal region and the liquid crystal/prepolymer region, that is, where UV light moves from the seal region into the liquid crystal/prepolymer region, and from the liquid crystal/prepolymer region into the seal region.

This will be explained specifically, referring to FIGS. 5A and 5B. When a UV beam moved in the direction of the arrow, the polymer formation speed was slowest at a part where the UV beam passed the seal region 13 consisted from spacer 14 and main sealer 13 covering it, and entered region 18 containing liquid crystal/prepolymer mixture, and the speed became faster in image display region 15, and more faster at a part where the UV beam passed region 19 and entered seal region 13. After the polymerization, in regions 18 and 19 there were regions of polymer network structures different from the image display region 15.

Figure 8:
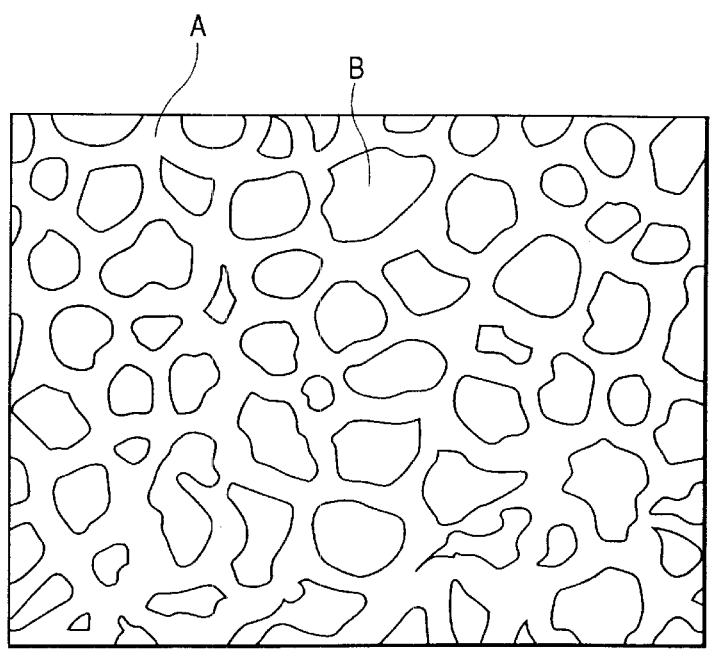
FIG. 8 is a schematic illustration of a sectional structure of a liquid crystal layer to be used in the liquid crystal display device of this invention.

The polymer network structure of image display region 15 and certain parts of regions 18 and 19 where the polymer network formation speed was different was examined in detail and structural difference was found. FIG. 8 is a schematic drawing to show a section of a liquid crystal/polymer observed by scanning electron microscopy, here A is the polymer part and B denotes liquid crystal part, and polymer part has a network structure. Although the difference in structure varied depending to the intensity of UV light, scanning speed of the slit, slit width, and distance between the slit and the panel, there was observed significant difference in average diameter of the network pores, average thickness of the network, shape of the network structure between these parts of regions 18 and 19 and entire display region 15. The both right and left hand side regions of image display region 15 were symmetrical and did not show any difference in polymer network structure. Table 1 shows the result.

TABLE 1

|  | average φ of network pore | average thickness of net | shape of network section |
|---|---|---|---|
| Part of region 18 having different network structure | 1.2 μm | 0.2 μm | not uniform |
| Image display region 15 | 1.4 μm | 0.3 μm | uniform |
| Part of region 19 having different network structure | 1.9 μm | 0.4 μm | slightly not uniform |

We think this structure difference is caused by the stress developed toward the change of volume during polymerization reaction to form the polymer network structure, or by the influence of the seal region to the polymerization reaction. It is considered that the irregularity of the displayed image results from uneven network structure due to not artificially controllable reaction circumstances or phenomena accompanying the progress of polymerization reaction. On the other hand, use of scanning with a UV beam for polymerization reaction enables us to control the initiation, progression, and termination of the polymerization reaction, and as a result, in the display region where the polymerization reaction proceeds uniformly, the influence of the various phenomena accompanying the polymerization reaction is made uniform to form a uniform polymer network structure.

In compensation for a uniform network structure in the image display region, uneven network structure is formed in regions where the polymerization reaction starts and terminates. More exactly, the latter region is where the growth of the polymer network structure is forcibly terminated by the presence of the sealant.

When irradiated with a UV beam through a slit, the formed network structure of the regions where the polymerization reaction starts and terminates is not only different from that of the image display region but different from each other. We think this is because network formation is influenced differently at the initiation and termination of polymerization reaction.

Luminance uniformity of thus prepared liquid crystal panel was evaluated by applying a potential to the opposing glass plate. When luminance was examined over the all panel region including image display region 15, difference in luminance was detected at the regions different in polymer network structure. This is explained specifically referring to FIGS. 5A and 5B. In FIGS. 5A and 5B, the luminance in regions 18 and 19 of which network structure is different from that of image display region 15 is about 10 to 20% higher than in image display region 15. When the formation of the regions 18, 15 and 19 were compared in plural samples, regions 18 and 19 were asymmetrical each other in formation. This shows that progression circumstances are different between the reaction-initiating part and the reaction-terminating part, and that regions 18 and 19 have a different function as a dummy polymerization region to lessen the irregularity of luminance.

From the above results, we think irregularity of display is caused by the phenomena accompanying the progression of the polymerization reaction, such as change in volume. Since it is impossible to carry out polymerization of a liquid crystal/prepolymer mixture all at once in the panel, we have found that it is important to provide a buffer region other than the image display region in the panel to absorb the influence of these phenomena and that it is effective to carry out UV exposure by scanning with a UV beam, as one of means to achieve it.

As one skilled in the art can see, when the panel is irradiated with a UV beam in the arrow direction in FIGS. 5A and 5B, a liquid crystal panel excellent in display ability can be obtained by scanning the panel with the UV beam, from the polymerization initiation point to the border of the display region at a slower speed, and the display region at a desired speed.

Alternatively, when the panel is scanned with a UV beam at a constant speed in the arrow direction of FIGS. 5A and 5B, a liquid crystal panel excellent in display ability can be obtained by irradiating the panel from the polymerization initiation point until the display region at the highest intensity and the display region at a desired intensity to form a uniform liquid crystal layer.

As speculated from the above results, display unevenness corresponding to the scanning direction of UV light may occur inherently. Actually, when the adjustment of UV exposure conditions was insufficient, even in the display region, was observed display unevenness apparently corresponding to the scanning direction. Accordingly, careful adjustment of UV exposure conditions including the shape of the UV beam and scanning conditions is required.

The reflection vs. voltage characteristic of liquid crystal panel thus obtained was notably improved in its evenness over the whole panel surface, and uneven brightness on display was eradicated sufficiently to be put to practice.

For example, when one stage UV radiation was applied with the illumination intensity of UV radiation being 40 mW/cm$^2$, slit width 12 mm, and moving speed of slit 0.2 mm/s, the unevenness in brightness over the panel surface was kept at ±5% or less. Further, when two stage UV radiation was applied with the first radiation consisting of 50 mW/cm$^2$ in UV illumination intensity, 5 mm in slit width and 1 mm/s in moving speed of slit, and the second radiation of 5 mJ/cm$^2$ in UV illumination intensity and 430 seconds in radiation duration, the unevenness in brightness over the panel surface was kept at ±5% or less. The same panel also gave better results in contrast, hysteresis and responding speed than conventional ones.

Furthermore, after each of R, G and B panels had been prepared to give an optimum radiation condition, and each panel fabricated so as to reproduce that optimum condition, they were assembled in a three-plate projector. Then, it was found that unevenness in brightness over the panel surface was significantly improved and quality of images was notably heightened.

EXAMPLE 2

In Example 1, was used a UV radiation device which was provided with a slit positioned right over the cell to scan the cell. Alternatively, a good result was also obtained when UV rays were previously changed into a beam by using a light-shielding mask and a projection optical system, and then the cell was scanned with the beam.

Figure 2:
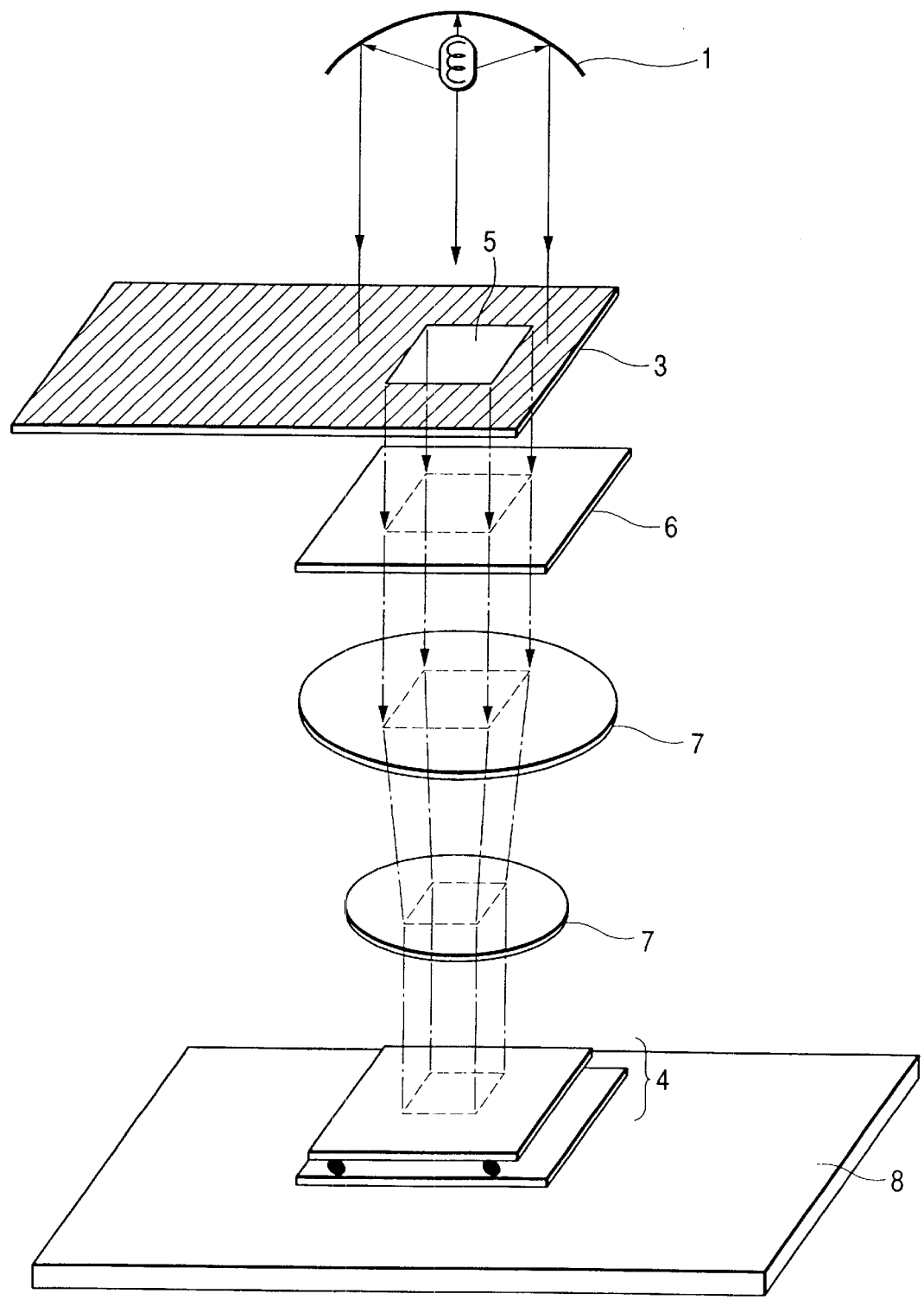
FIG. 2 is a schematic example of the constitution of a light radiation device applicable to the production method of the liquid crystal display device of this invention.

FIG. 2 is a diagram outlining the constitution of light-radiation system of the second example of this invention.

In FIG. 2, 1 represents a light source, 3 a light-shielding mask, 4 a liquid crystal panel, 5 a slit, 6 an optical filter, 7 a converging lens, and 8 an X-Y stage with a temperature control capability.

In this example, a mixture of liquid crystal/prepolymer of 4:1 was injected at ordinary pressure into a cell produced by bonding a glass substrate to a reflection type active matrix in panel 4 with a sealing agent and a spacer in between.

In this example, UV light having a peak of wavelength at 350 to 400 nm emitted from a light source was shaped with a light-shielding mask, and cut by an optical filter (band-pass filter) which passes only rays of a wavelength of 350 to 400 nm. The beam was then reduced to a desired size using a lens and used to scan the liquid crystal panel placed on the X-Y stage 8 equipped with a temperature controller.

In this system, the exposure position can be finely adjusted by X-Y stage 8, and thus the exposure area of the liquid crystal can be finely controlled.

In addition, the exposure time can be changed by moving the position of light-shielding mask 3 during irradiation, and the shielding area can be changed by changing the shape of light-shielding mask 3. Thus, one apparatus permits a multiple stage (such as two-stage) UV exposure at a time, to improve the productivity.

A similar investigation was made while the condition for UV radiation was chosen to be the same with that of Example 1.

The reflection vs. voltage characteristic of liquid crystal panel thus obtained was notably improved in its evenness over the whole panel surface, similarly to that of Example 1, as compared with conventional panels, and uneven brightness on display was eradicated.

The same panel also gave better results in contrast, hysteresis and responding speed than conventional ones.

EXAMPLE 3

It is possible in this invention to obtain the same good results by moving an optical system thereby scanning a beam over a liquid crystal panel.

Figure 3:
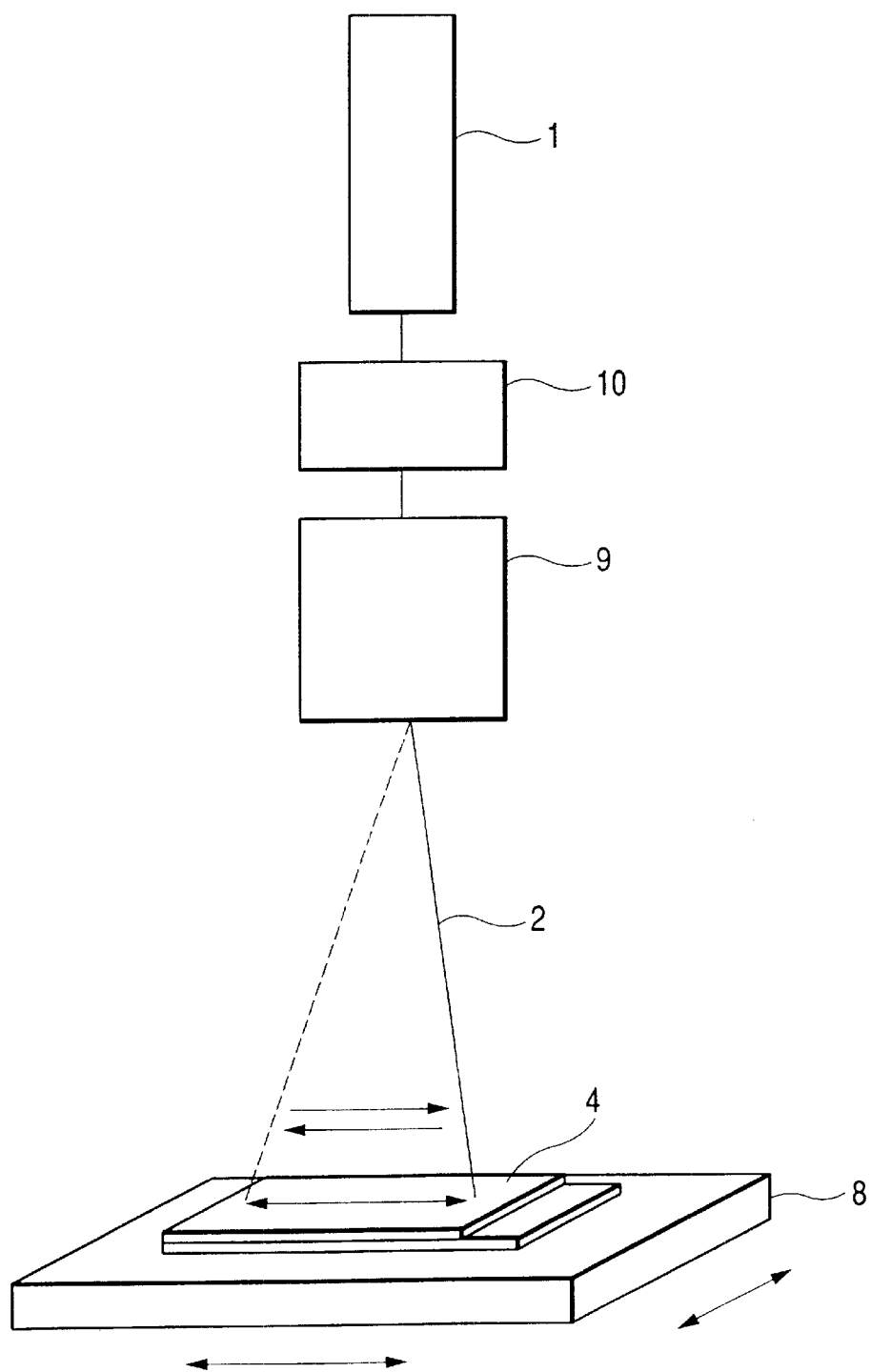
FIG. 3 is a schematic example of the constitution of a light radiation device applicable to the production method of the liquid crystal display device of this invention.

FIG. 3 is a diagram to show the constitution of a system to emit a light beam. In FIG. 3, 1 represents a light source such as a UV laser, and 2 a light beam shaped into a spot beam by an optical system (not shown), with which a liquid crystal panel 4 is scanned. Further, 10 represents a light modulation unit to switch on and off the light beam, and 9 a beam scanning device to scan the light beam over the liquid crystal panel 4 using an optical mechanism. This system can be easily prepared after a computer-controlled driving system of the type conventionally well-known has been modified appropriately. This example may also incorporate an X-Y stage 8 as in Examples described above.

In this example, a light beam was scanned over the liquid crystal panel or on a two-dimensional space while it was being switched on and off under the action of light modulation device and beam scanning device, thereby to cause the prepolymer material to polymerize and harden. Accordingly, it is quite easy for this system to make, for light radiation, multiple beam scans over the same site only by changing parameters of the system as appropriate.

The UV radiation condition used in the investigation of this example will be shown below.

(1) For one-stage UV radiation

Illumination intensity of UV radiation: 20 to 150 mW/cm$^2$

Energy of UV radiation: 0.2 to 10 J/cm$^2$ (2) For two-stage UV radiation

First stage radiation

Illumination intensity of UV radiation: 20 to 150 mW/cm$^2$

Energy of UV radiation: 0.1 to 1.5 J/cm$^2$

Second stage

Illumination intensity of UV radiation: 1 to 20 mW/cm$^2$

Energy of UV radiation: 0.2 to 10 J/cm$^2$

Investigation was made while the temperature of cell during radiation was kept over the point where the components comprising the mixture of liquid crystal/prepolymer start to separate each other through phase difference, but less than the level by 30° C. above that point.

The reflection vs. voltage characteristic of liquid crystal panel thus obtained was notably improved in its evenness over the whole panel surface, and uneven brightness on display was eradicated sufficiently to be put to practical use.

For example, when one stage UV radiation was applied with the illumination intensity of UV radiation being 40 mW/cm$^2$, and the energy of UV radiation 2.4 J/cm$^2$, the unevenness in brightness over the panel surface was kept at ±5% or less. Further, when two stage UV radiation was applied with the first radiation consisting of 50 mW/cm$^2$ in UV illumination intensity and 0.25 J/cm$^2$ in UV radiation energy, and the second radiation of 5 mW/cm$^2$ in UV illumination intensity and 2.2 J/cm$^2$ in UV radiation energy, the unevenness in brightness over the panel surface was kept at ±5% or less. The same panel also gave better results in contrast, hysteresis and responding speed than conventional ones.

Further, for two-stage radiation, even when the second radiation consisted of overall, simultaneous radiation instead of beam scans, the same results were obtained. Furthermore, for five-stage radiation where the illumination intensity of second and subsequent radiations was kept the same and lower than that of the first radiation, the same results were obtained as above.

To make the most of advantages available to the light beam scanning mode adopted in this example, the first radiation was applied to the area including the display area of liquid crystal panel, and the second radiation to the area out of the display area, and the result was compared with the corresponding result obtained when a light beam was scanned evenly over the panel surface. It was found as a result that the former further reduced an unevenness in brightness over the panel surface as compared with the latter. This added effect is probably obtained as a result of following facts: the radiation mode in question allows control of progression of polymerization reactions, and peripheral areas not exposed to the first radiation act as a buffer to absorb stresses developed in association with polymerization and hardening of the prepolymer component which is exposed to the first radiation. The same results were obtained from a two-stage radiation where the second radiation consisted of beam scans over the liquid crystal surface, or of overall, simultaneous radiation thereof.

Furthermore, after each of R, G and B panels had been prepared to give an optimum radiation condition, and each panel fabricated so as to reproduce that optimum condition, they were assembled in a three-plate projector. Then, it was found that unevenness in brightness over the panel surface was significantly improved and quality of images was notably heightened.

Although UV rays were used in these examples, it is possible to obtain the same effect of this invention by scanning a laser beam over a liquid crystal panel surface comprising a thermosetting prepolymer material.

In the examples described above, light radiation may take place a plurality of times.

Further, light radiation may consist of a first radiation, and second and subsequent radiations with a weaker intensity.

Furthermore, light radiation may be applied, after having been selectively applied to the area including at least the image displaying area of substrate surface, over the whole surface of substrate.

Still further, light radiation may consist of giving a first radiation selectively on the area including at least the image displaying area of substrate surface, and of giving a second radiation on the area including at least areas not exposed to the first radiation and out of the above image displaying area.

Still further, the aforementioned light radiation may consist of giving a first radiation selectively on the area including at least the image displaying area of substrate surface, of giving a second radiation on the area including at least areas not exposed to the first radiation and out of the above image displaying area, and of giving a third radiation on the whole substrate surface.

What is claimed is:

1. A preparation method for a liquid crystal display comprising the steps of:

providing a mixture of a liquid crystal material and a prepolymer material in a space between two substrates at least one of which is transparent; and irradiating with an exposure light to cause polymerization of the prepolymer material by scanning with a light beam a first region of the mixture corresponding to a display region and a second region outside the first region;

wherein the beam is band-shaped and formed by a slit;

wherein the scanning using the slit starts from the second region, passes through the first region and ends at the second region; and wherein the scanning in the second region is carried out at a higher scanning speed than in the first region while scanning from the second region toward the first region.

2. The preparation method for a liquid crystal display according to claim 1, wherein the scanning is carried out with a higher intensity of illumination than in the first region while scanning from the second region toward the first region.

3. The preparation method for a liquid crystal display according to claim 1, wherein UV light is used for exposure.

4. The preparation method for a liquid crystal display according to claim 1, wherein exposure is carried out by using a light-emitting device.

5. The preparation method for a liquid crystal display according to claim 4, wherein the radiation device contains scanning means to scan the pair of substrates with a light beam of the exposure light.

\* \* \* \* \*

UNITED STATES PATENT AND TRADEMARK OFFICE
CERTIFICATE OF CORRECTION

PATENT NO. : 6,476,887 B1
DATED : November 5, 2002
INVENTOR(S) : Yasuhiro Sekine et al.

It is certified that error appears in the above-identified patent and that said Letters Patent is hereby corrected as shown below:

Column 1,
Line 12, "it, and" should read -- It. The present invention --;
Line 18, "inch" should read -- inches --;
Line 19, "according to" should read -- given the --;
Line 20, should read -- high resolution and brightness liquid crystal projector, --;
Line 23, "entering into a" should read -- to enter the --;
Line 25, "TN" should read -- the TN --; "type," should read -- type --; and "rapid" should read -- a rapid --;
Line 26, "contrast" should read -- contrast, as --; and "STN" should read -- the STN --;
Line 31, "polarizers, which" should read -- polarizers. Such a --;
Line 39, "polymer" should read -- the polymer --;
Line 41, "TN" should read -- the TN --;
Line 43, "polymer" should read -- the polymer --; and "scattered," should read -- scattered --;
Line 51, "spongy" should read -- a spongy --;
Line 55, "the active matrix" should read -- reflection type active matrix --;
Line 56, "substrate of reflection type." should read -- substrate. --; and
Line 60, "pixel" should read -- the pixel --.

Column 2,
Line 3, "ultra-violet" should read -- ultraviolet --;
Line 10, "initiator)" should read -- initiator), --;
Line 22, "liquid" should read -- the liquid --;
Line 23, "intensity," should read -- intensity --;
Line 24, "its" should be deleted; and "liquid" should read -- the liquid --;
Line 25, "panel," should read -- panel --;
Line 27, "accounted for by" should read -- due to --;
Line 28, "uneven" should read -- an uneven --;
Line 30, "polymerization" should read -- the polymerization --; and "one can think" should be deleted;
Line 31, "polymerization reaction, which" should read -- the polymerization reaction --;
Line 33, "monomer" should read -- a monomer --;
Line 46, "polymerization and it" should read -- polymerization. It --;
Line 50, "becomes often" should read -- often becomes --; and
Line 61, "region," should read -- region --.

Column 3,
Line 12, "brightness on display or unevenness in" should read -- display brightness or --;
Line 17, "process" should read -- process, --;
Line 19, "prepolymer" should read -- prepolymer, --;

UNITED STATES PATENT AND TRADEMARK OFFICE
CERTIFICATE OF CORRECTION

PATENT NO. : 6,476,887 B1
DATED : November 5, 2002
INVENTOR(S) : Yasuhiro Sekine et al.

It is certified that error appears in the above-identified patent and that said Letters Patent is hereby corrected as shown below:

Column 3 (cont'd),
Line 21, "brightness in the panel," should read -- panel brightness, --;
Line 24, "reflection" should read -- the reflection --;
Line 27, "the" should read -- to a --;
Line 49, "to show" should read -- showing --; and
Line 60, "brightness," should read -- brightness --.

Column 4,
Line 2, "of" should read -- having --; and "unevenness in" should read
-- brightness unevenness --;
Line 3, "brightness," should be deleted;
Line 5, "images" should read -- the images --;
Line 8, "of all" should be deleted;
Line 10, "are" should be deleted;
Line 12, "polymer" should read -- the polymer --;
Line 13, "polymerization" should read -- the polymerization --;
Line 14, "difference" should read -- differences--;
Line 18, "all" should be deleted;
Line 19, "over" should be deleted; "surface" should read -- entire surface --; and "time," should read -- given time,--;
Line 20, "photo-polymerization reaction," should read -- the photo-polymerization reaction--;
Line 21, "polymer" should read -- the polymer --;
Line 25, "polymer" should read -- the polymer --;
Line 45, "panel" should read -- the panel --;
Line 53, "pad" should read -- the pad --;
Line 54, "display" should read -- the display --;
Line 55, "display panel," should read -- the display panel --;
Line 56, "display" should read -- the display --;
Line 61, "intensity" should read -- intensity, --;
Line 63, "substrates," should read -- the substrates, --; and "variation," should read
-- variation --;
Line 64, "wrong actions of the panel." should read -- erroneous panel actions. --;
Line 65, "panel" should read -- the panel --.

Column 5,
Line 2, "structure" should read -- structure, --;
Line 6, "substrate," should read -- substrate --;
Line 7, "reflection" should read -- the reflection --;
Line 8, "and," should read -- and --;

UNITED STATES PATENT AND TRADEMARK OFFICE
CERTIFICATE OF CORRECTION

PATENT NO. : 6,476,887 B1
DATED : November 5, 2002
INVENTOR(S) : Yasuhiro Sekine et al.

It is certified that error appears in the above-identified patent and that said Letters Patent is hereby corrected as shown below:

Column 5 (cont'd),
Line 10, "section," should read -- section --; and "with" should read -- as --;
Line 11, "the" (first occurrence) should be deleted;
Line 17, "implantation," should read -- implantation --;
Line 19, "submitted" should read -- submitted to --;
Line 20, "oxidation," should read -- oxidation --;
Line 26, "implantation," should read -- implantation --;
Line 28, "photo-resist" should read -- photoresist --;
Line 30, "implantation," should read -- implantation --;
Line 35, "(Nondope Slicate Glass)/BPSG" should read -- (nondope silicate glass)/BPSG --;
Line 36, should read -- (boro-phospho-silicate glass) or TEOS (tetraethoxy- --;
Line 37, "Silane)." should read -- silane). --; and "PSG 208" should read -- PSG208, --;
Line 38, "holes," should read -- holes --;
Line 58, "(Electron Beam)" should read -- (electron beam) --;
Line 62, "(Chemical Mechanical Polishing)." should read -- (chemical mechanical polishing). --; and
Line 66, "above" should read -- the above --.

Column 6,
Line 19, "action," should read -- action --;
Line 26, "discontinued," should read -- discontinued --;
Line 27, "pixel." should read -- the pixel. --;
Line 29, "pixel" should read -- the pixel --;
Line 50, "flatness," should read -- flatness --;
Line 57, "liquid" should read -- the liquid --;
Line 61, "switching" should read -- the switching --;
Line 63, "Diode switches," should read -- diode switches --; and "thin-" should read -- thin --; and
Line 66, "thin-membrane" should read -- thin membrane --.

Column 7,
Line 1, "(Silicon On Insulator)" should read -- (silicon on insulator) --;
Line 8, "reflective electrode," should read -- the reflective electrode --;
Line 12, "registers," should read -- registers --;
Line 22, "active" should read -- the active --;
Line 27, "opposite" should read -- the opposite --;
Line 31, "opposite" should read -- the opposite --; and "inner" should read -- the inner --;
Line 37, "(Indium-Tin-Oxide)" should read -- (indium tin oxide) --;
Line 42, "be used also" should read -- also be used --;

UNITED STATES PATENT AND TRADEMARK OFFICE
CERTIFICATE OF CORRECTION

PATENT NO.    : 6,476,887 B1
DATED         : November 5, 2002
INVENTOR(S)   : Yasuhiro Sekine et al.

It is certified that error appears in the above-identified patent and that said Letters Patent is hereby corrected as shown below:

Column 7 (cont'd),
Line 47, "with" should be deleted;
Line 49, "serves for main-" should read -- maintains --;
Line 50, "taining" should be deleted; and "active" should read -- the active --;
Line 53, "resins" should read -- resins, --;
Line 55, "polymer" should read -- the polymer --;
Line 59, "spacer" should read -- the spacer --;
Line 62, "a" should be deleted; and
Line 67, "display," should read -- the display, --.

Column 8,
Line 1, "prevention" should read -- the prevention --;
Line 2, "development" should read -- the development --; and "brightness in display." should read -- display brightness. --;
Line 3, "an injection port of liquid crystal." should read -- a liquid crystal injection port. --;
Line 9, "followings." should read -- the following. --;
Line 11, "Firstly," should read -- First, --;
Line 12, "What" should read -- Polyacrylate --;
Line 13, "them is polyacrylate." should read -- them. --;
Line 19, "invention," should read -- invention --;
Line 48, "rays," should read -- rays --;
Line 59, "micro-lens" should read -- microlens --; and
Line 60, "projection" should read -- a projection--.

Column 9,
Line 3, "diaphragm" should read -- the diaphragm --;
Line 5, "condition" should read -- condition, --;
Line 12, "is of course" should read -- is, of course, --;
Line 20, "components," should read -- components --;
Line 28, "Firstly," should read -- First, --;
Line 29, "panels," should read -- panels --;
Line 31, "matters and dusts." should read -- matter and dust. --;
Line 34, "dioxide," should read -- dioxide --; and "wave" should read -- wave. --;
Line 35, "." should be deleted;
Line 36, "necessary" should read -- necessary, --;
Line 54, "ITO" should read -- the ITO --;
Line 57, "bonding" should read -- bonding, --;
Line 59, "spacer" should read -- the spacer --;
Line 60, "liquid" should read -- the liquid --; and "panel." should read -- the panel. --;

UNITED STATES PATENT AND TRADEMARK OFFICE
CERTIFICATE OF CORRECTION

PATENT NO. : 6,476,887 B1
DATED : November 5, 2002
INVENTOR(S) : Yasuhiro Sekine et al.

It is certified that error appears in the above-identified patent and that said Letters Patent is hereby corrected as shown below:

Column 9 (cont'd),
Line 62, "here," should be deleted; and
Line 64, "after-curing," should read -- after-curing --.

Column 10,
Line 2, "gap" should read -- the gap --; and "owing" should read -- be due --;
Line 7, "will" should read -- will be --;
Line 12, "process" should read -- process, --;
Line 18, "cell" should read -- the cell --;
Line 24, "firstly," should read -- first, --;
Line 25, "material of prepolymer" should read -- prepolymer material --;
Line 27, "material of liquid" should read -- liquid crystal material --;
Line 28, "crystal" should be deleted; and "phenylbezoate" should read
-- phenylbenzoate --;
Line 36, "chamber" should read -- chamber, --;
Line 37, "Firstly," should read -- First, --;
Line 39, "50° C.," should read -- 50° C --;
Line 57, "prepolymer" should read -- prepolymer, --;
Line 59, "crystal/prepolymer" should read -- crystal/prepolymer, --;
Line 60, "degassing" should read -- the degassing --; and
Line 65, "evacuation," should read -- evacuation --.

Column 11,
Line 2, "main" should read -- the main --;
Line 8, "cell" should read -- the cell --;
Line 21, "completed" should read -- was completed --;
Line 26, "cell," should read -- the cell, --;
Line 27, "cell" should read -- the cell --;
Line 32, "container" should read -- a container --;
Line 39, "mixture" should read -- the mixture --;
Line 41, "phases," should read -- phases --;
Line 44, "mixture" should read -- the mixture --;
Line 46, "display" should read -- display would --; and
Line 48, "liquid" should read -- the liquid --.

Column 12,
Line 25, "system" should read -- system, --;
Line 26, "is" should read -- are --;
Line 27, "another," should read -- another --;
Line 36, "slit" should read -- the slit --;

UNITED STATES PATENT AND TRADEMARK OFFICE
CERTIFICATE OF CORRECTION

PATENT NO. : 6,476,887 B1
DATED : November 5, 2002
INVENTOR(S) : Yasuhiro Sekine et al.

It is certified that error appears in the above-identified patent and that said Letters Patent is hereby corrected as shown below:

Column 12, (cont'd),
Line 44, "width" should read -- the width --;
Line 49, "cell" should read -- the cell, --; and "radiation" should read -- radiation, --;
Line 50, "owning" should read -- due --;
Line 51, "polymer" should read -- the polymer --;
Line 60, "exposed" should read -- being exposed --;
Line 64, "cell," should read -- the cell, --; and
Line 65, "cell" should read -- the cell --.

Column 13,
Line 1, "above, the" should read -- the above, --;
Line 2, "Co.," should read -- Co. --;
Line 5, "matters" should read -- matter --;
Line 10, "active" should read -- the active --;
Line 11, "substrate," should read -- substrate --;
Line 29, "bit by bit" should read -- bit-by-bit --;
Line 36, "with also" should read -- also with --;
Line 38, "cell" should read -- the cell --;
Line 41, "each" should read -- from each --;
Line 43, "milky" should read -- the milky --;
Line 46, "polymer" should read -- the polymer --;
Line 52, "region," should read -- region --;
Line 57, "consisted from" should read -- consisting of --;
Line 58, "it," should read -- it --;
Line 60, "more" should read -- even --;
Line 63, "19" should read -- 19, --;
Line 66, "19" should read -- 19, --; and
Line 67, "different" should read -- different, --.

Column 14,
Line 3, "here" should read -- where --;
Line 6, "to" should read -- on --;
Line 9, "average" should read -- the average --;
Line 12, "The both" should read -- Both --;
Line 31, "structure," should read -- structure --;
Line 34, "to not" should read -- to reaction circumstances not --;
Line 35, "reaction circumstances" should be deleted;
Line 36, "polymerization" should read -- the polymerization --;
Line 55, "poly-" should read -- the poly- --;
Line 57, "thus prepared" should read -- the thus-prepared --;

UNITED STATES PATENT AND TRADEMARK OFFICE
CERTIFICATE OF CORRECTION

PATENT NO. : 6,476,887 B1
DATED : November 5, 2002
INVENTOR(S) : Yasuhiro Sekine et al.

It is certified that error appears in the above-identified patent and that said Letters Patent is hereby corrected as shown below:

Column 14 (cont'd),
Line 59, "all" should read -- entire --;
Line 64, "19" should read -- 19, --; and
Line 65, "15" should read -- 15, --.

Column 15,
Line 1, "asymmetrical" should read -- asymmetrical to --;
Line 7, "of" should read -- of the --;
Line 15, "of" should be deleted;
Line 35, "was observed" should be deleted;
Line 36, "direction." should read -- direction was observed. --;
Line 39, "of" should read -- of the --;
Line 41, "brightness on" should read -- display brightness --;
Line 42, "display" should be deleted; and "to" (second occurrence) should read -- into --;
Line 58, "fabricated" should read -- had been fabricated --;
Line 65, "was used" should be deleted --; and
Line 66, "cell" should read -- cell was used --.

Column 16,
Line 4, "of light-" should read -- of the light- --;
Line 14, "of wavelength at" should read -- wavelength of --;
Line 16, "mask," should read -- mask --;
Line 28, "time," should read -- time --;
Line 31, "with" should read -- as --;
Line 33, "of" should read -- of the --;
Line 36, "similarly" should read -- similar --;
Line 43, "system" should read -- system, --;
Line 45, "to show" should read -- showing --;
Line 47, "laser," should read -- laser --;
Line 48, "shown)," should read -- shown) --;
Line 50, "beam," should read -- beam --;
Line 54, "well-known" should read -- well known --;
Line 56, "Examples" should read -- the examples --;
Line 58, "space" should read -- space, --;
Line 59, "light" should read -- the light --; and
Line 60, "to cause" should read -- causing --.

UNITED STATES PATENT AND TRADEMARK OFFICE
CERTIFICATE OF CORRECTION

PATENT NO.    : 6,476,887 B1
DATED         : November 5, 2002
INVENTOR(S)   : Yasuhiro Sekine et al.

It is certified that error appears in the above-identified patent and that said Letters Patent is hereby corrected as shown below:

Column 17,
Line 12, "cell" should read -- the cell --;
Line 15, "separate" should read -- separate from --;
Line 17, "liquid" should read -- the liquid --;
Line 19, "brightness on" should read -- display brightness --;
Line 20, "display" should be deleted;
Line 23, "mW/cm$^2$," should read -- mW/cm$^2$ --;
Line 44, "liquid crystal panel," should read -- the liquid crystal panel --;
Line 47, "found" should read -- found, --;
Line 48, "result" should read -- result, --;
Line 52, "progression" should read -- the progression --;
Line 57, "radiation" should read -- radiation, --;
Line 58, "surface," should read -- surface --; and
Line 62, "fabricated" should read -- had been fabricated --.

Column 18,
Line 10, "radiation," should read -- radiation --;
Line 14, "substrate" should read -- the substrate --;
Line 18, "substrate surface," should read -- the substrate surface --; and
Line 24, "substrate" should read -- the substrate --.

Signed and Sealed this

Twenty-third Day of August, 2005

JON W. DUDAS
*Director of the United States Patent and Trademark Office*